United States Patent [19]

Hamilton et al.

[11] Patent Number: 5,490,027
[45] Date of Patent: Feb. 6, 1996

[54] GIMBALED MICRO-HEAD/FLEXURE/CONDUCTOR ASSEMBLY AND SYSTEM

[75] Inventors: Harold J. Hamilton, Santa Clara; Timothy W. Martin, Los Altos, both of Calif.

[73] Assignee: Censtor Corp., San Jose, Calif.

[21] Appl. No.: 783,619

[22] Filed: Oct. 28, 1991

[51] Int. Cl.[6] .................................................. G11B 5/60
[52] U.S. Cl. ............................................ 360/104; 360/103
[58] Field of Search ................................. 360/103, 109, 360/123, 126

[56] References Cited

U.S. PATENT DOCUMENTS

| | | | |
|---|---|---|---|
| 3,805,290 | 4/1974 | Thompson | 360/103 |
| 3,864,748 | 2/1975 | Herdman et al. | 360/102 |
| 4,028,734 | 6/1977 | Mos | 360/104 |
| 4,167,765 | 9/1979 | Watrous | 360/103 |
| 4,245,267 | 1/1981 | Herman | 360/104 |
| 4,306,258 | 12/1981 | Higashiyama | 360/104 |
| 4,363,045 | 12/1982 | Herman | 360/104 |
| 4,422,115 | 12/1983 | Spash | 360/104 |
| 4,811,140 | 4/1989 | Enami et al. | 360/104 |
| 4,819,091 | 4/1989 | Brezoczky | 360/122 |
| 4,829,395 | 5/1989 | Coon et al. | 360/104 |
| 4,858,043 | 8/1989 | Kadokura | 360/122 |
| 4,901,185 | 2/1990 | Kubo et al. | 360/104 |
| 5,001,583 | 3/1991 | Matsuzaki | 360/103 |
| 5,006,946 | 4/1991 | Matsuzaki | 360/103 |
| 5,041,932 | 8/1991 | Hamilton | 360/104 |
| 5,115,363 | 5/1992 | Khan et al. | 360/104 |
| 5,124,864 | 6/1992 | Matsuzaki | 360/104 |
| 5,124,870 | 6/1992 | Toyoda | 360/126 |
| 5,164,869 | 11/1992 | Fontana | 360/126 |
| 5,198,934 | 3/1993 | Kubo et al. | 360/104 |

*Primary Examiner*—Edward P. Westin
*Assistant Examiner*—Andrew Sanders
*Attorney, Agent, or Firm*—Kolisch Hartwell Dickinson McCormack & Heuser

[57] ABSTRACT

A low-mass head/flexure/conductor assembly for reading and writing information with respect to a rigid magnetic recording disk. The assembly includes a read/write transducer unit, an elongate flexure, and gimbal structure interconnecting and articulating the transducer unit and the flexure for selected, limited relative roll and pitch, without relative yaw. Conductive ribbons that form part of the gimbal structure also form part of the conductive circuit provided in the assembly. The assembly has an effective mass of no more than about 1.5-milligrams. Plural, hardened, wear-resistant feet are formed on the transducer unit for enabling sliding contact with the recording surface in a disk.

126 Claims, 8 Drawing Sheets

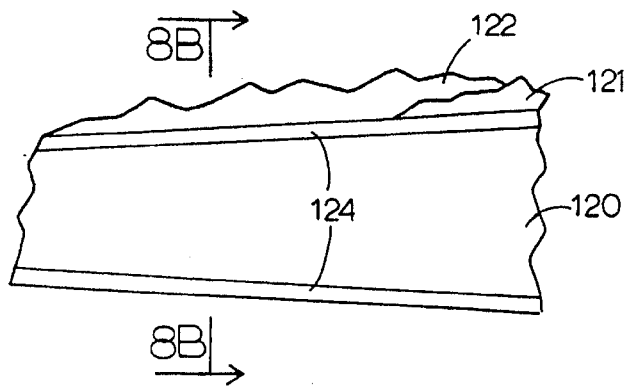 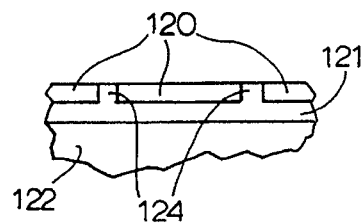
FIG. 8A  FIG. 8B
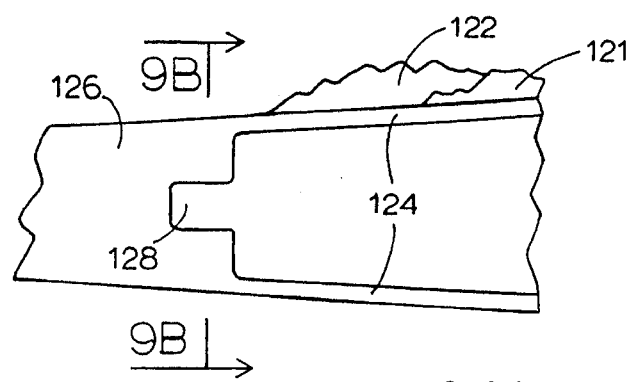 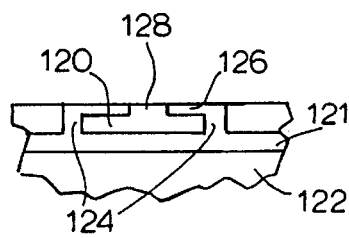
FIG. 9A  FIG. 9B
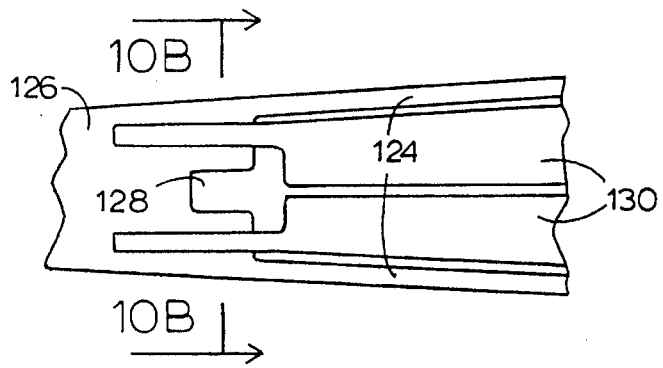 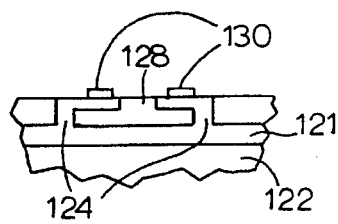
FIG. 10A  FIG. 10B

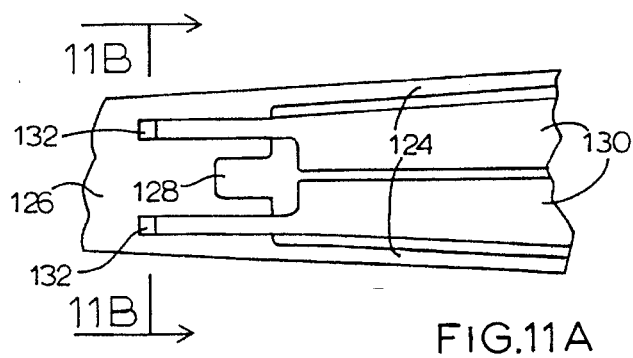
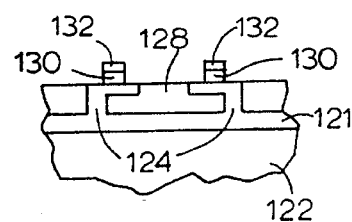
FIG.11A    FIG.11B
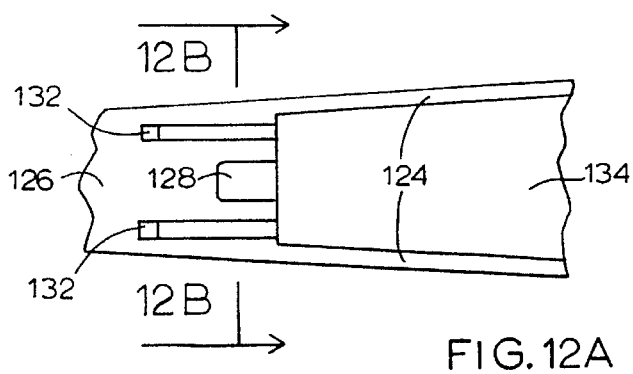
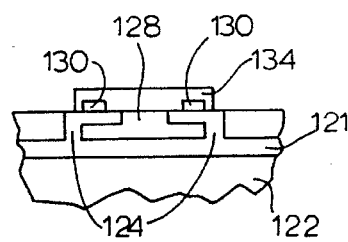
FIG.12A    FIG.12B
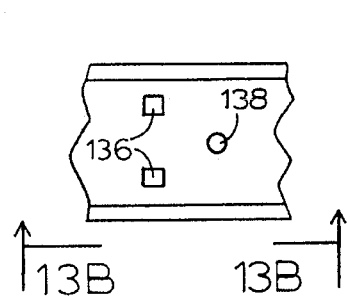
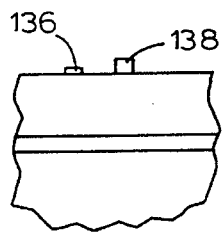
FIG.13A    FIG.13B
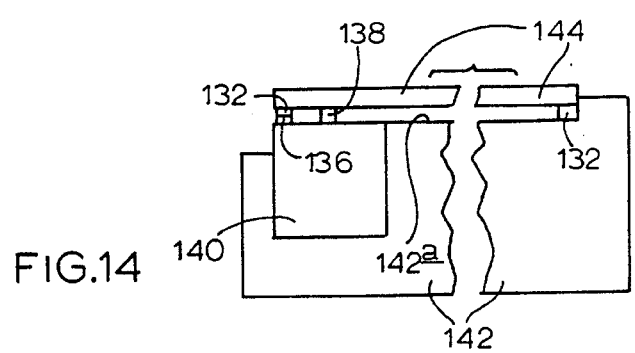
FIG.14

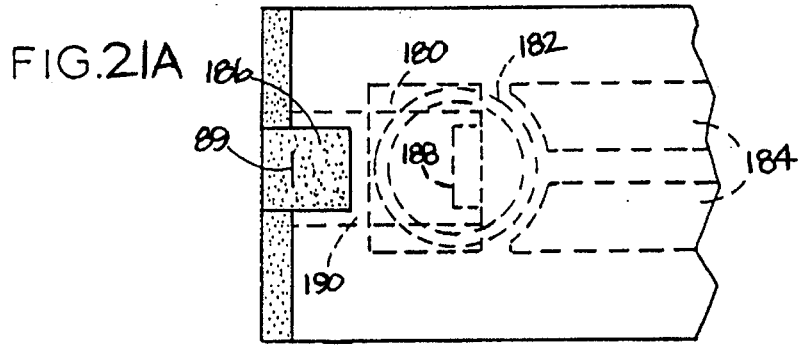
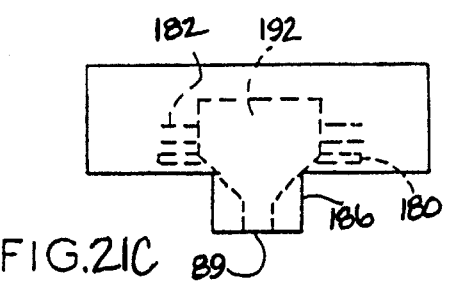
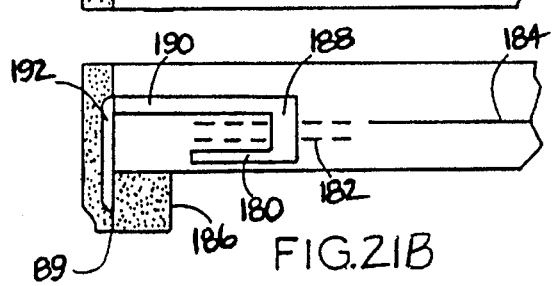
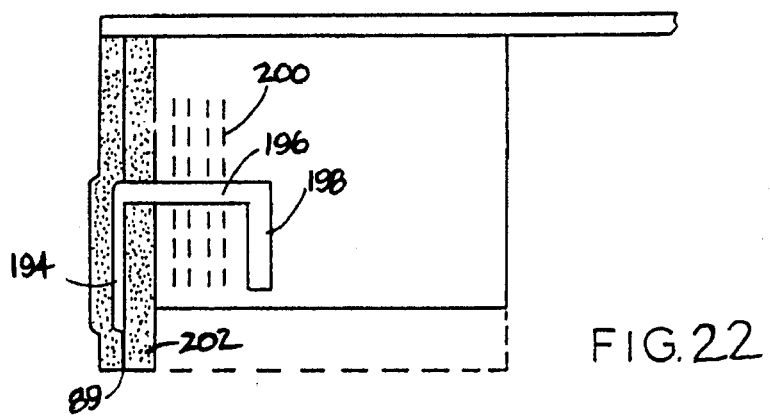

though the invention may be employed in a rigid disk recording system of
GIMBALED MICRO-HEAD/FLEXURE/CONDUCTOR ASSEMBLY AND SYSTEM

BACKGROUND AND SUMMARY OF THE INVENTION

This invention relates generally to a rigid-disk information-storage system, and more particularly to a miniature, low-mass, gimbaled, head/flexure/conductor assembly for use in and with such a system.

For the purposes of illustration and explanation herein, a preferred embodiment of such an assembly, and of a system employing the same, are disclosed in the setting of an extremely small-format, largely self-contained storage system which employs one or more rotary, rigid, magnetic recording disks. Those skilled in the art, after reading the contents of this specification, will recognize that the invention may be employed in a rigid disk recording system of any size.

The quest for increasing storage density and decreasing costs in rigid medium disk drive data storage systems has focused attention on the need to minimize the separation between the head (transducer) and the media—the so-called "flying height" of the usual air-bearing slider. Improvements in slider and associated manufacture, along with improvements in media surface properties, have enabled the flying height in available rigid disk systems to be reduced to about 0.1-micrometer. Numerous efforts are now devoted to reducing even further the flying height to 0.05-micrometer, or less. These efforts face and present still greater challenges respecting the issue of volume manufacture of sliders, suspensions, media and their assembly and operation in disk drive systems.

With regard to the issue of flying-head technology, significant advances over this prior art technology have been made and are disclosed in the following U.S. patent and co-pending U.S. patent applications: U.S. Pat. No. 5,041,932 for INTEGRATED MAGNETIC READ/WRITE HEAD/FLEXURE/CONDUCTOR STRUCTURE, issued Aug. 20, 1991; U.S. patent application Ser. No. 07/632,958 for METHOD OF MAKING INTEGRATED MAGNETIC READ/WRITE HEAD/FLEXURE/CONDUCTOR STRUCTURE, filed Dec. 21, 1990, now U.S. Pat. No. 5,073,242; U.S. patent application Ser. No. 07/710,561 for INTEGRATED MAGNETIC READ/WRITE HEAD/FLEXURE/CONDUCTOR STRUCTURE, filed Jun. 5, 1991, now U.S. Pat. No. 5,111,351; U.S. patent application Ser. No. 07/710,891 for INTEGRATED MAGNETIC READ/WRITE HEAD/FLEXURE/CONDUCTOR STRUCTURE, filed Jun. 11, 1991, now U.S. Pat. No. 5,163,218; U.S. patent application Ser. No. 07/684,025 for WEAR-RESISTANT HEAD FOR CONTACT READING AND WRITING MAGNETIC MEDIA, filed Apr. 10, 1991, now abandoned; U.S. patent application Ser. No. 07/746,916 for UNITARY MICRO-FLEXURE STRUCTURE AND METHOD OF MAKING SAME, filed Aug. 19, 1991, now abandoned; U.S. patent application Ser. No. 07/760,586 for HIGH-CAPACITY, MICRO-SIZE, RIGID-DISK, MAGNETIC DIGITAL-INFORMATION STORAGE SYSTEM, filed Sep. 16, 1991, now abandoned; and U.S. patent application Ser. No. 07/783,509 for SIZE-INDEPENDENT, RIGID-DISK, MAGNETIC, DIGITAL-INFORMATION STORAGE SYSTEM WITH LOCALIZED READ/WRITE ENHANCEMENTS filed Oct. 28, 1991, now abandoned. The respective disclosures of these documents are hereby incorporated by reference into the present disclosure.

With regard to the above-incorporated materials, in the '932 patent, the patentee describes a very low-mass, integrated head/flexure/conductor structure for continuous sliding-contact operation with rigid media, thereby enabling the minimum possible head/media separation and the maximum achievable recording performance. By reducing "effective mass" (see the '916 patent application) and applied load by two to three orders of magnitude, relative to conventional air-bearing sliders and suspensions, the local pressure exerted on asperities or microscopic contaminants may be kept well below the onset of destructive physical and chemical avalanche processes, which processes lead to catastrophic failure of the head/media interface. Such reduction of the local pressure also helps to reduce the rate of abrasive wear of the head and media and to extend useful operational life.

The validity of the logic behind the development set forth in the '932 patent has been demonstrated in more than two-hundred-thousand hours of wear testing of Flexhead™ integrated head/suspension structures on numerous test fixtures (Flexhead™ is a trademark owned by Censtor Corp. of San Jose, Calif.). Likewise, read/write tests of these structures, employing probe-type heads with two-layer perpendicular recording media, have demonstrated a capability for very high recording density. Moreover, the extremely small mass of these structures, and the rigidity of the suspensions result in high resonant frequencies in the lateral and torsional bending modes, and enable thereby significant improvements in actuator and servo-system design and performance.

With a further specific look at material incorporated by reference above, the pending '025 patent application describes improvements in an integrated head/flexure/conductor structure (such as that set forth in the '932 patent) which improvements provide for the employment of wear-resistant material (a wear-resistant contact pad) in the region which makes contact with the media. This '025 patent application additionally sets forth limitations on the length and width of the wear-resistant contact pad which derive from the need to minimize signal modulation resulting from axial run-out of the disk or other mechanical variance in the drive.

The present invention addresses this latter concern, and in addition focuses on the desirability of further extending the performance tolerance of integrated head/suspension structures to mechanical variations in the manufacture and assembly of disk drives.

Accordingly, an important object of the present invention is to provide a novel low-mass micro-head/flexure/conductor assembly which minimizes signal modulation resulting from nonflatness from a disk surface, from accumulated assembly tolerances, from improper alignment of the disk spindle and actuator support bearing, or from other mechanical imperfections which might give rise to unwanted dynamic separation between the transducer and the recording surface of the media.

A correlative object of the invention, in the setting just expressed, is to increase the permissible tolerance on disk run-out, spindle alignment, etc., without impairment of the performance of integrated head/suspension structures.

Another key objective of the invention is to increase permissible dimensional and alignment tolerances in the assembly of integrated head/suspension structures and media in disk drives in order to achieve optimal performance with minimal adjustment and run-in time.

A further object of this invention is to extend the limits on contact pad dimensions without incurring detrimental signal modulation resulting from disk run-out or other mechanical imperfections.

Still another object is to minimize head and media wear by enabling a larger contact pad area and consequently a lower local pressure at the head/media interface.

Still another object of the present invention is to separate the manufacture of head and flexure/conductor structures, and to facilitate automated assembly of the one to the other into integrated head/flexure/conductor structures.

An object related to that just stated is to increase the number of heads which may be fabricated by deposition processes on a wafer, thereby correspondingly decreasing manufacturing costs.

Another related object of the invention is to facilitate independent optimization of materials, configurations, and processes in the fabrication of both the heads and the flexure/conductor structures.

Proposed according to a preferred embodiment of the invention is a micro-head/flexure/conductor assembly, or organization, (for reading and writing information with respect to the recording surface in a rigid magnetic recording medium) which assembly includes a read/write transducer unit, an elongate carrier unit for supporting the transducer unit, and gimbal structure interconnecting and articulating these two units for selected, limited relative movement. Significantly, constituent materials and sizing for these assembly components are chosen in such a manner that the effective mass of the assembly is no greater than about 1.5-milligrams. The definition of "effective mass", as such is employed herein, is found in the text of the '916 patent application referred to hereinabove.

Included in the assembly which has just been outlined is the necessary conductor structure which cooperates with the magnetic components in the transducer unit and which is employed for communicating with the "outside world". Uniquely, a part of this conductor structure in a preferred embodiment, in the form of two laterally spaced conductive ribbons, also forms a portion of the interconnective gimbal structure. In modified forms of the invention, gimbal ribbons formed of dielectric material carry conductive traces. This gimbal structure unites the transducer unit and the carrier unit in a generally parallel planar relationship, and allows limited relative pitch and roll between these two units while at the same time inhibiting relative yaw between the two.

A fulcrum projection formed on a surface in the transducer unit rockingly contacts a surface expanse provided on the carrier unit—these two components cooperating with the conductive ribbons to form the gimbal structure which defines the permitted pitching and rolling that can occur between the two units.

Feet that project from an opposite surface in the transducer unit, preferably formed of a hardened wear-resistant material, are provided for making sliding contact with the recording surface in a disk medium.

These and other important features, objects and advantages which are attained by the present invention will become more fully apparent as the description that now follows is read in conjunction with the accompanying drawings.

DESCRIPTION OF THE DRAWINGS

FIGS. 8A, 8B, 9A, 9B, 10A, 10B, 11A, 11B, 12A, 12B, 13A, 13B, and 14 are fragmentary views illustrating steps employed in the fabrication of the assembly of the invention.

FIGS. 21A, 21B, 21C illustrate an alternative embodiment featuring a probe-type head including a multi-layer spiral, or "pancake", type coil. These three figures are derived directly from three corresponding figures in the above-referred-to Ser. No. 07/684,025 patent application, and are included solely for the purpose of illustrating herein the layout of such a head and coil arrangement per se (i.e., without special regard to the immediately surrounding material environment). The reference numerals employed in these three figures have been changed from those which are used in the '025 patent application corresponding figures in order to attain internal consistency in this document.

FIG. 22 shows yet another probe-type head embodiment including a "pancake" type coil, and this figure, like FIGS. 21A, 21B, 21C, has also similarly been derived from a corresponding figure in the '025 referenced patent application, with reference numerals changed for the same reason.

DETAILED DESCRIPTION OF, AND BEST MODE FOR CARRYING OUT, THE INVENTION

Figure 1:
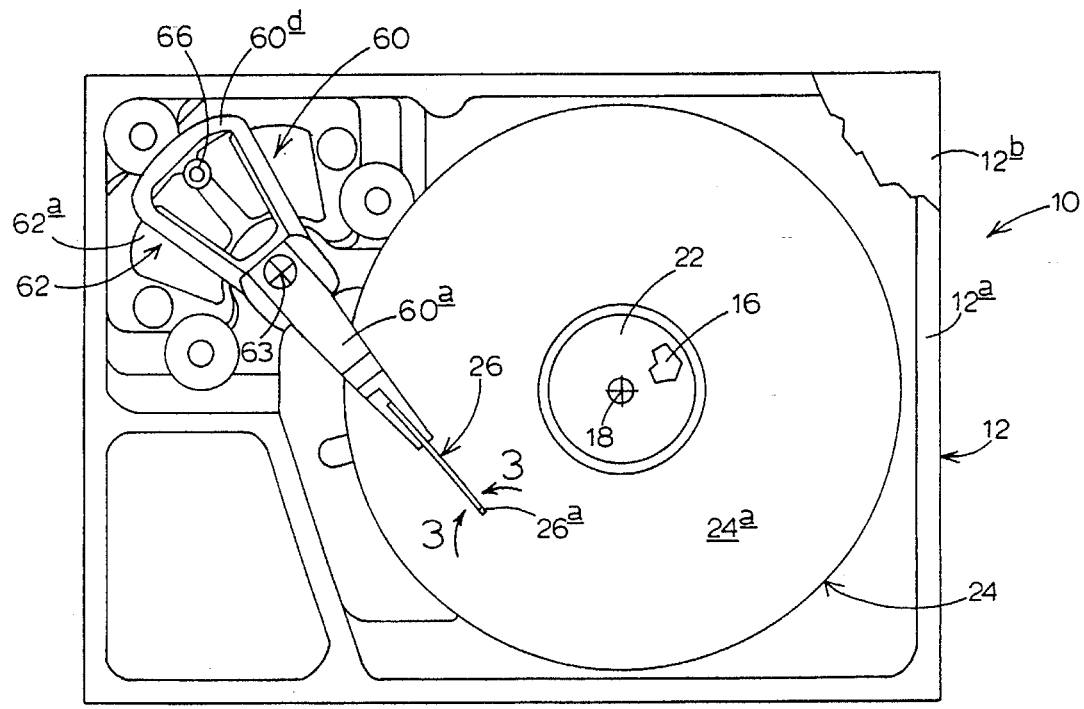
FIG. 1 is an opened-up plan view illustrating a small-format, rigid-magnetic-disk, digital-information storage system incorporating a gimbaled microhead/flexure/conductor assembly constructed in accordance with the present invention. This assembly is illustrated in FIG. 1 in highly schematic form, and for the sake of simplicity, given the scale of FIG. 1, without detailing respecting its precise configuration and number of component elements.
Figure 2:
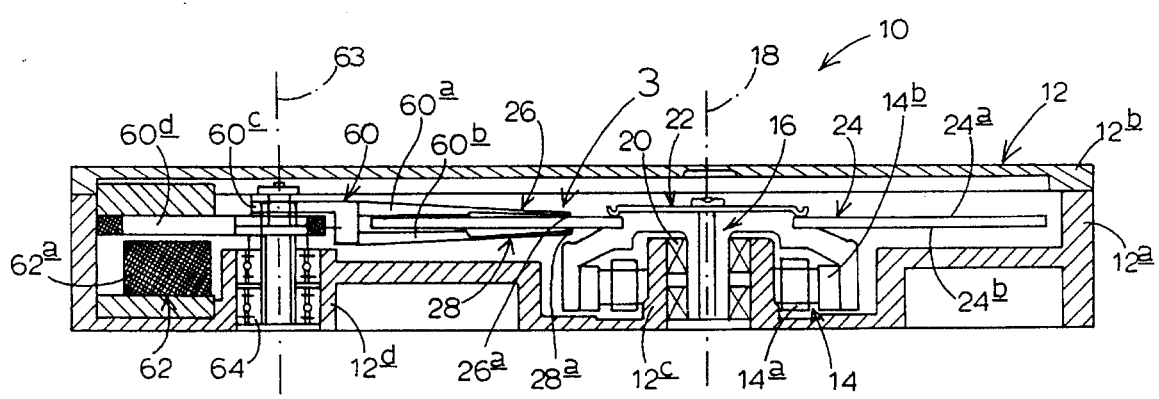
FIG. 2 is a view on a slightly larger scale than that used in FIG. 1 which illustrates, in longitudinal section, the system of FIG. 1, with this view of FIG. 2 taken as if looking generally upwardly from the bottom of FIG. 1.

Turning attention now to the drawings, and referring first of all to FIGS. 1 and 2, indicated generally at 10 is an information storage system in the form of a rigid-disk-drive magnetic recording system for storing digital information, which system is constructed in accordance with the present invention.

Included in system 10 is a two-part housing 12, including a base 12a, and, sealingly joined thereto (as via a concealed gasket made, for example, of silicone rubber), a cover 12b. Housing 12 encloses all of the other components which, together with the housing, make up system 10. In the preferred embodiment now being described, the inside of the sealed housing is maintained essentially at nominal atmospheric pressure. However, there may be instances, where it is desirable to enhance certain performance behavior, to evacuate the housing, and to this end a suitable evacuation pressure is about 0.05-atmosphere.

Disposed within housing 12 is a low-power, brushless, D.C. spindle motor 14 which includes a coil-carrying stator 14a mounted suitably on the outside of a hollow, cylindrical supporting boss 12c formed in housing base 12a. Motor 14 also includes a permanent-magnet rotor 14b which is suitably joined, with the disposition shown, to a lightweight rotary spindle 16. Spindle 16 is mounted, through a journal bearing 20 which is seated within the hollow interior of boss 12c, for rotation about an axis shown at 18.

During drive operation, through appropriate connections (not shown) with conventional control/feedback electronics, motor 14 maintains an accurate, constant spindle rotational speed of about 4800-rpm.

Supported on the upper side of spindle 16 (for rotation as a unit therewith) through a suitable clamp 22 is a rigid magnetic recording disk (medium) 24 which is prepared on its opposite axial sides with a magnetic layer surface structure, or surface, for two-sided reading and writing of digitized information. These two sides of disk 24 are shown at 24a, 24b. Information is recorded on this surface structure in concentric, adjacent recording tracks.

Further discussing disk 24, each recording surface takes the form of an underlying soft magnetic flux-return layer with an in-plane, preferably radially oriented, magnetic anisotropy, and an outer, or overlying, hard magnetic recording film with an out-of-plane magnetic anisotropy. The recording film is protected by a smooth overcoat of wear-resistant material (like carbon), and a lubricant layer to minimize head and disk wear.

Because of the fact, which will become apparent, that the loads applied to disk 24 herein are far reduced in comparison with loads applied to disks in prior art flying-head drives, the central supporting substrate of the disk can optionally be made thinner than those substrates which are employed in prior art disks. For example, in the system now being described, the transducers, or transducer units, (still to be described) which are used contact the disk's recording surfaces, do so with a load of only about 40- to about 120-milligrams. Such a load is several orders of magnitude lower than comparable load forces that characterize transducer/disk loading in prior art flying-head designs.

Among the end results of all of this are not only that head/disk wear is greatly minimized, but so also are the overall system size and system operating-power requirements.

Cooperating with disk 24 in system 10 in the embodiment now being described, for reading and writing digital information with respect to recording surfaces 24a, 24b, are two read/write organizations, or micro-head/flexure/conductor assemblies 26, 28, respectively, which are constructed in accordance with the special features of the present invention. Each of assemblies 26, 28, as will be explained more fully below, is gimbaled in construction, and includes a read/write transducer unit (or slider) carried adjacent the distal end of the assembly (ends 26a, 28a), through gimbal structure, on the distal end of an elongate, cantilevered, laterally tapered carrier unit, or flexure. Each of these elongate assemblies is mounted with its fixed end at an angle of about 3-degrees with respect to the associated surface of disk 24, and each has an effective mass, as expressed earlier, of no more than about 1.5-milligrams. The transducer units in these assemblies contact the associated disk surface through hardened wear feet, or pads, with the force mentioned above.

Continuing with a general description of other components included in system 10, indicated generally at 60 in FIGS. 1 and 2 is a servo-controlled actuator which operates in conjunction with a voice coil motor 62 to support and move the two head/flexure/conductor assemblies (26, 28) in arcs over the opposing recording surfaces in disk 24, thus to position the transducers in these assemblies with respect to any selected, concentric read/write track on the disk's surfaces.

The actuator is a relatively lightweight assembly (about 1.5-grams) which pivots on an axis shown at 63, with this assembly including upper and lower, radially extending arms 60a, 60b which carry, in a radially extending, cantilevered fashion, previously mentioned micro-head/flexure/conductor assemblies 26, 28, respectively. These arms are borne on a central rotary hub 60c which is journaled on the inside of a hollow, cylindrical boss 12d formed in housing base 12a. A suitable journal connection is established through a journal bearing 64 which is like previously mentioned bearing 20.

Actuator 60 is a mass-balanced rotary design, with the cantilevered masses of arms 60a, 60b, and of assemblies 26, 28, counterbalanced by a counterbalance-formation 60d which, in the embodiment now being described, takes the form of a coil winding that actually forms the "rotor" in previously mentioned voice coil motor 62. A position limiter pin 66 (see FIG. 1) limits the swing of the transducers in assemblies 26, 28 to an arc of about 30-degrees, which allows these transducers to sweep into operative positions over the full recordable expanses of recording surfaces 24a, 24b. More specifically, pin 66 permits the transducers to swing inwardly to a distance of about 9-mm from axis 18 and outwardly to a distance of about 23-mm from the same axis. Those skilled in the art will thus recognize that the system of the present invention is capable of reading and writing data radially inwardly on a disk (regardless of media form factor) closer to the spin axis than the innermost radial locations typically usable by conventional flying-head systems.

Forming the stator in motor 62, which stator cooperates with rotor 60d, are permanent magnets, such as magnet 62a, which are suitably joined to base 12a beneath the rotor.

The rotary actuator and associated mechanism selected for system 10 herein can be viewed as taking the form essentially of a pivoted beam with read/write transducer units located adjacent one end, and with a voice coil motor positioned adjacent the opposite end. When energized during system operation, actuator 60 moves the transducer units in arcuate paths approximating radial paths over the recording surfaces in disk 24. In conventional flying-head drives, such arcuate motion with a rotary actuator creates head-skewing effects which cause significant variations in air-bearing stiffness, and consequent changes in head/media spacing. However, because the system of the present invention does not rely upon air-bearing effects in order to maintain a uniform head/disk interface, head skew is largely irrelevant, and actuator 60 can be used successfully to transport the transducers radially inwardly to positions very close to spin axis 18.

In system 10, motion in actuator 60 is controlled using conventional closed-loop servo techniques, with appropriate servo-positioning data recorded within data tracks in disk 24 to form a feedback loop that ensures accurate transducer-unit positioning.

Conventional high-transfer-rate data-channel structure (not shown) is employed to provide an electrical interconnection between the head/flexure/conductor assemblies and conventional interface electronics which connect system 10 to external devices.

System 10, as described herein, includes but a single recording disk. However, one should recognize that a like system may be constructed for plural disks, and such a system is described in the '586 patent application referred to above.

Addressing attention now to the constructions of assemblies 26, 28, and focusing attention particularly on FIGS. 3–7, inclusive, each of these assemblies is essentially the same in construction as the other, and accordingly, the following description will focus just on the construction of assembly 26. This assembly includes a generally planar read/write transducer unit, or slider, 84, and an elongate, generally planar carrier unit, or flexure, 86, the distal end in which is joined, as will be explained, to the transducer unit through gimbal structure 88 for limited relative articulation between the transducer unit and the flexure. Units 84, 86 are thought of herein as being disposed generally in parallel-planar relationship, with the carrier unit supporting the transducer unit.

Figure 4:
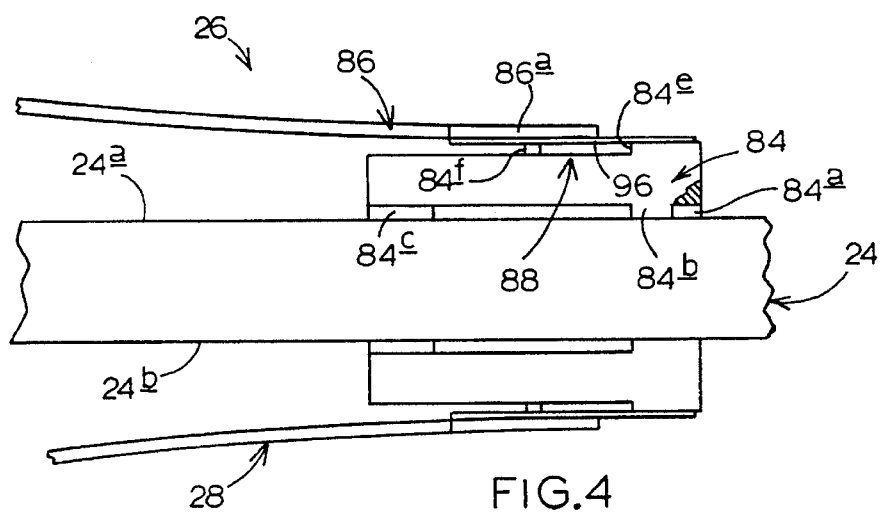
FIG. 4 is a fragmentary view, on substantially the same scale as that employed in FIG. 3, taken generally along the line 4—4 in FIG. 3.
Figure 5:
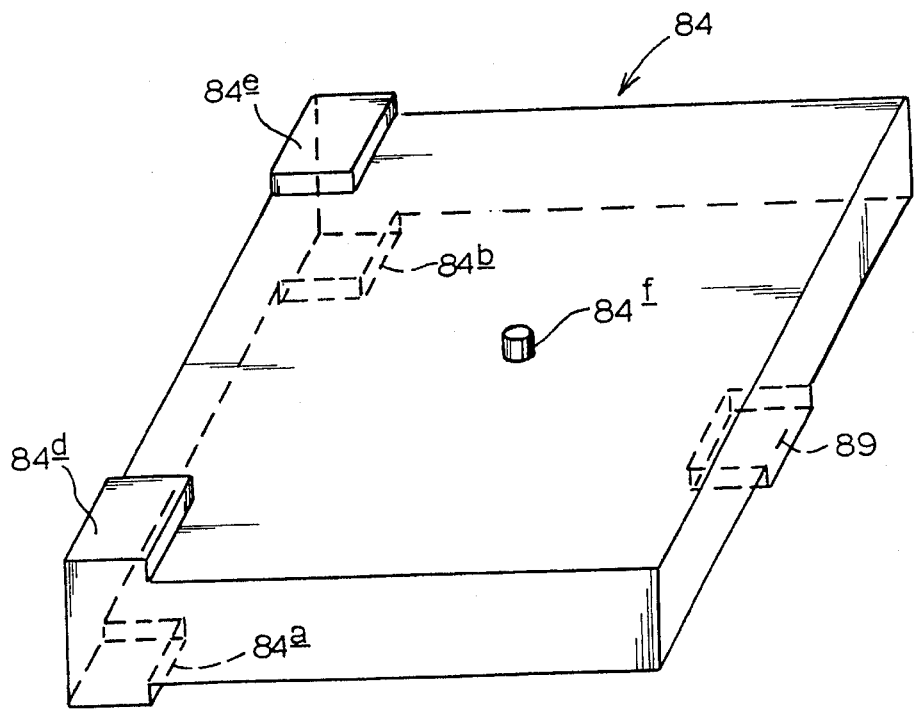
FIG. 5 is an even more greatly enlarged perspective view of a generally planar read/write transducer unit, or slider, which forms part of the micro-head/flexure/conductor assembly of the invention, with this unit shown isolated from other structure.

Unit 84 includes a solid body formed entirely by thin-film deposition, patterning and etch-release processes (such as those set forth in the '932 patent, and in the '958, '891 and '916 patent applications) of a suitable dielectric material, such as aluminum oxide, diamond-like carbon (DLC), combinations of the two, or others. This body is shaped with three projecting feet, seen herein at 84a, 84b, 84c, which function as contact pads to define three areas of sliding contact with a media surface during normal operation. Regardless of the material which makes up the bulk of the body in unit 84, preferably, and as disclosed herein, feet 84a, 84b, 84c are formed of a hardened wear-resistant material (Knoop hardness no less than about 1000-kg/mm$^2$), such as DLC, with these feet protruding about 10- to about 15-micrometers beyond the surface of unit 84 which is adapted to face a media recording surface—i.e., the surface of this unit which faces the viewer in FIG. 3, and which forms the undersurface of unit 84 as seen in FIGS. 4 and 5. The projection distance just mentioned has been selected to allow for normal wear of these feet, and also to ensure that the associated "confronting" surface of unit 84 is always sufficiently removed from a media recording surface to avoid undesirable air-bearing effects.

Figure 3:
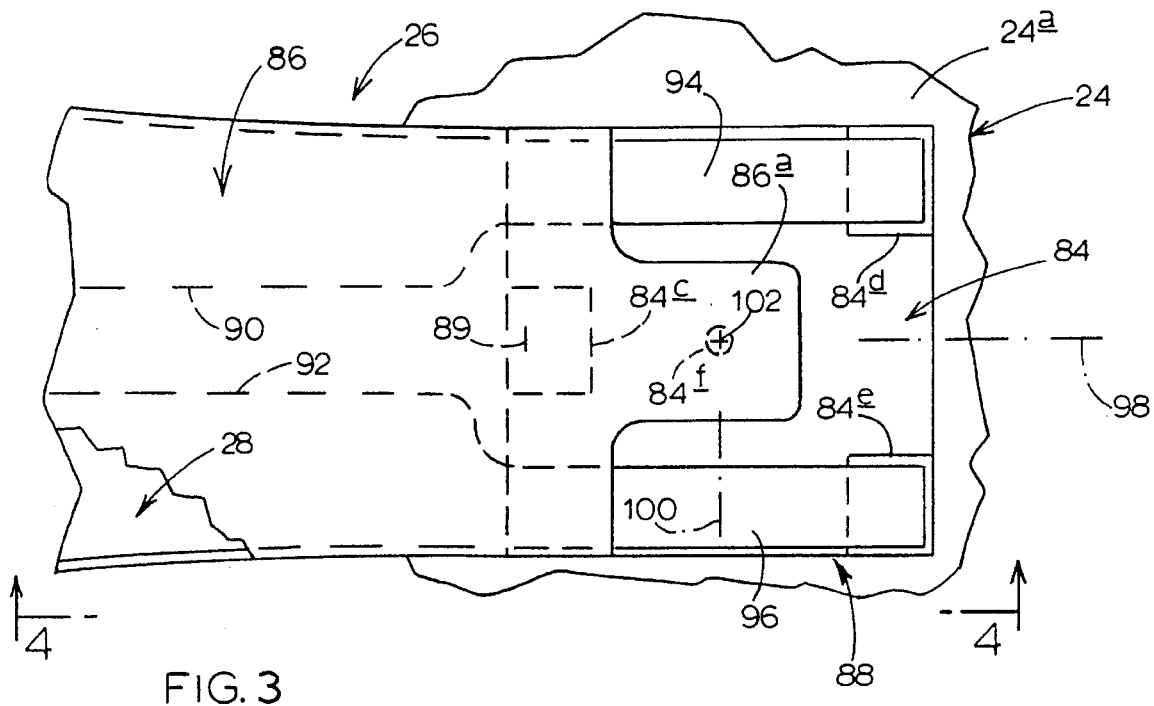
FIG. 3 is a greatly enlarged, fragmentary plan detail, taken generally in the area embraced by the two curved arrows shown at 3—3 in FIG. 1, illustrating details of construction of the micro-head/flexure/conductor assembly incorporated in the system of FIGS. 1 and 2.

Embedded and encapsulated in unit 84 is an electromagnetic read/write head, or head structure, including a pole tip which is herein encapsulated in foot 84c, as illustrated schematically at 89 in FIGS. 3 and 5. In the embodiment now being described, the particular read/write head structure which is employed is of the probe type, and the construction of such a head structure within the body of unit 84 is achieved in accordance with the teachings of the '932 U.S. patent, and of the '958 and '025 patent applications.

Extending at the locations shown from the opposite surface of the body in unit 84 are two projecting posts 84d, 84e which are formed of a highly conductive metal, such as gold. These posts function both as a part of conductor structure in assembly 26, and as bonding pads through which joinder occurs, as will be explained, between unit 84 and flexure 86. These two posts connect conductively with conductive structure embedded within the body of unit 84 which extends to and forms a coil that operates as a part of the read/write head structure mentioned (see the '932 patent). Also projecting from the same surface from which the posts project is a somewhat central pivot stud, or fulcrum structure, 84f, formed of aluminum oxide or DLC, which functions as a part of previously mentioned gimbal structure 88.

Posts 84d, 84e project from their associated surface in the body of unit 84 by a distance of about 10- to about 15-micrometers, and the same is true with respect to stud 84f.

Figure 6:
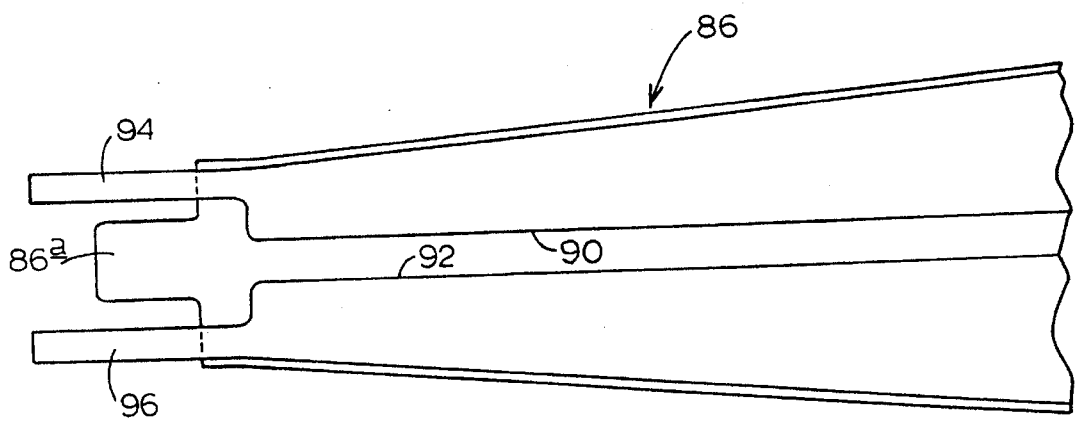
FIG. 6 is a fragmentary plan view, on a scale somewhat smaller than that employed in FIG. 3, illustrating a generally planar carrier unit, or flexure, which forms part of the micro-head/flexure/conductor assembly of the invention, with this carrier unit shown isolated from other structure.
Figure 7:
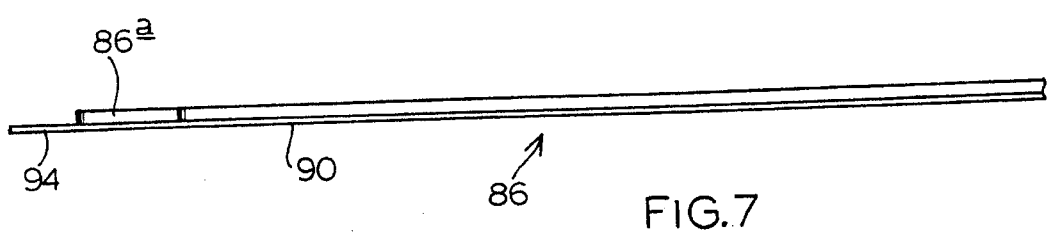
FIG. 7 is a fragmentary elevation taken generally from the top side of FIG. 6.

Flexure 86 is formed also through thin-film deposition, patterning and etch-release processes to have an elongate, laterally tapered shape such as that partially illustrated in FIGS. 3 and 6. (Tapered construction, and its formation, are specifically described and discussed in above-referenced '916 patent application.) Deposited on or encapsulated within the body of flexure 86, which body preferably takes the form of a dielectric material such as those mentioned earlier, are two elongate conductors, or conductor structure, 90, 92. These conductors are formed, for example of gold, by thin-film deposition and patterning processes, with conductors 90, 92 having respective, distally extending leaf-spring extensions, or ribbons, 94, 96 of gold or other suitable conducting material, e.g., tantalum, which is insolvent in the etch-release bath. The distal ends of ribbons 90, 92 are bonded conductively to posts 84d, 84e, respectively, in unit 84. These laterally spaced ribbons function both as a part of gimbal structure 88, and as a part of the conductor structure in assembly 26 interconnecting the conductor structure which is within unit 84 with that which is within flexure 86.

As can be seen particularly in FIGS. 3 and 6, the distal end 86a in flexure 86 projects in a central blade-like fashion, and the surface expanse of this extension which faces unit 84 rockingly contacts the distal end of stud 84f and functions as the portion of gimbal structure 88 which transmits a vertical force to unit 84.

Suitable gimbal action requires that gimbal structure 88 resist motion of unit 84 relative to flexure 86 in all directions in their respective parallel planes, while allowing limited free relative rolling and pitching of the transducer unit about axes 98, 100, respectively, via rocking interaction between stud 84f and flexure end 86a. The projection distances expressed above for posts 84d, 84e and for stud 84f allow a suitable range of such rolling and pitching motion. Ribbons 94, 96 resist yawing motion, for example about an axis such as axis 102 (see FIG. 3) between the transducer unit and the flexure.

Shifting attention now from the invention's structural organization, and refocussing a look at fabrication of the assembly of the invention, as has been pointed out hereinabove, most of the fabrication steps, processes, materials, etc. relating to the transducer and carrier units are fully elaborated in several of the earlier-referenced, prior-filed patent applications and in the '932 patent. Not discussed in those materials, however, are the steps employed in establishing the gimbal-structure interconnection. The remaining, now-to-be-examined drawing figures in this disclosure, 8A, 8B-14, inclusive, relate to that story.

Preferably, multiple rows of side-by-side-adjacent flexures and associated ribbons are prepared simultaneously. Formation of the gimbal ribbons begins with the deposition of aluminum oxide, DLC, or other suitable dielectric material 120 on the polished surface of an etch-release layer 121 (e.g. copper) on a host wafer 122. This is done in the manner previously described (in the referenced materials), and to a thickness of about 30-micrometers (see FIGS. 8A, 8B). Isolation walls 124 of the same etch-release material may be formed prior to the deposition of flexure material, together with planarization to define the lateral boundaries of each flexure, as described in the reference material. Alternatively, these lateral dimensions may be defined in a later operation by a selective etch process. In the case of DLC, selective plasma ashing or oxidation of the carbon provides a very effective means of isolating individual flexures.

Turning to FIGS. 9A, 9B, on the planarized surface thus formed, layer 126 of copper is deposited and patterned, defining a constituent 128 which ultimately will become an end 86a of a flexure. Additional dielectric material is deposited, and the surface is again planarized, resulting in a thickness for copper layer 126 of about 3- to about 5-micrometers. Layer 130 of gold, about 3- to about 5-micrometers thick (see FIGS. 10A, 10B), is then deposited and patterned to form what will become flexure conductors 90, 92 and ribbons 94, 96. Gold bonding studs, such as the two shown at 132 (shown with intentionally distorted proportions in FIGS. 11A, 11B), are now deposited on what will be the distal ends of the flexure ribbons and on the ends of the flexure conductors (the ends of the latter not being shown) to facilitate the later bonding of the flexure both to the posts in a transducer unit, and to conductors provided in the external flexure support structure furnished by an actuator arm, respectively.

The wafer is, at this point in the procedure, ready for slicing between rows into bars of laterally adjacent flexures in preparation for bonding (gimbal interconnecting) of transducer units and flexures. Optionally, the "conductor" portions of layer 130 may be overcoated with a thin layer 134 of dielectric material, leaving the "ribbon" portions, and the bonding studs on the opposite ends of each flexure, exposed as shown in FIGS. 12A, 12B.

Digressing for a moment, fabrication of the transducer units for the assemblies is accomplished in multiple rows of side-by-side-adjacent units, and in much the same manner as that described in the '932 patent respecting the formation of integrated heads, except in reverse order. That is, contact pads formed of wear-resistant material are first deposited on the polished surface of an etch-release layer of copper on top of a host wafer. Since each transducer unit will have a gimbal suspension, three contact pads rather than one are formed. Dielectric material, high-permeability magnetic material, and electrical conductors are deposited and patterned to create the transducer in the form of a probe type perpendicular head with a helical coil, as described in the cited patent; or, a multilayer, pancake type coil construction may be created as described in the '025 patent application. Alternatively, the transducer units could be fabricated with conventional ring-structure heads for use with longitudinally oriented media. The final wafer-level deposition processes leave the surfaces as shown in FIGS. 13A, 13B, revealing gold bonding studs (with intentionally distorted proportions) 136 (which become posts, like posts 84d, 84e), and a load pivot stud 138 (which becomes a pivot stud, like stud 840 formed of dielectric material.

The wafer is now sliced between rows of transducer units into bars of laterally adjacent transducer units, in which the registration of each unit corresponds precisely with that of adjacent flexures on a bar of laterally adjacent flexures. The cut surface of each "transducer" bar, which exposes the ends of the magnetic cores of the internal transducer, is lapped and polished in preparation for the deposition of the pole and yoke structures, and of a protective overcoat, as described in the '958 patent application.

The next operation (see FIG. 14) involves the bonding of the flexures on one bar to the transducer units on another bar. A transducer-unit bar 140 is placed in a suitable fixture 142 in such a manner that bonding studs 136 protrude slightly above an upper surface 142a (in FIG. 14) of fixture 142. A flexure-unit bar 144 is placed in fixture 142 such that the bonding studs 132 of the flexures rest on top of bonding studs 136 which project above bar 140. Transducer units and flexure units on bars 140, 144, respectively, are now joined by pressure welds (or by other suitable means), thus making mechanical and electrical connections between the confronting bonding studs.

In the final fabrication step, the two unit-carrying bars, supported by fixture 142, thus joined, are immersed in an acid etch solution which simultaneously releases the transducer units and the flexure units from their respective bars, leaving the transducer units attached to the flexure units via the gimbal ribbons. In the process, layer 126 of copper dissolves, thereby freeing the gimbal ribbons from support, and allowing the transducer units to rock about the pivot studs.

Figure 15:
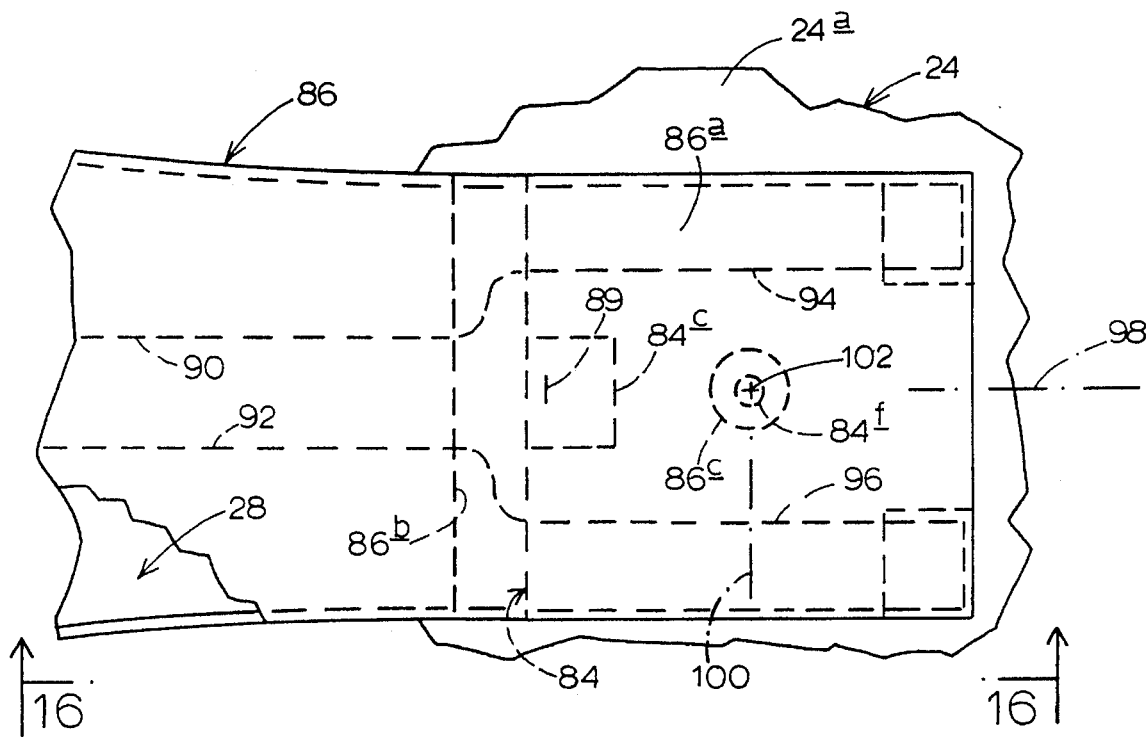
FIGS. 15 and 16 are fragmentary views, similar to those present in FIGS. 3 and 4, respectively, illustrating a modified form of a gimbaled head/flexure/conductor assembly.
Figure 16:
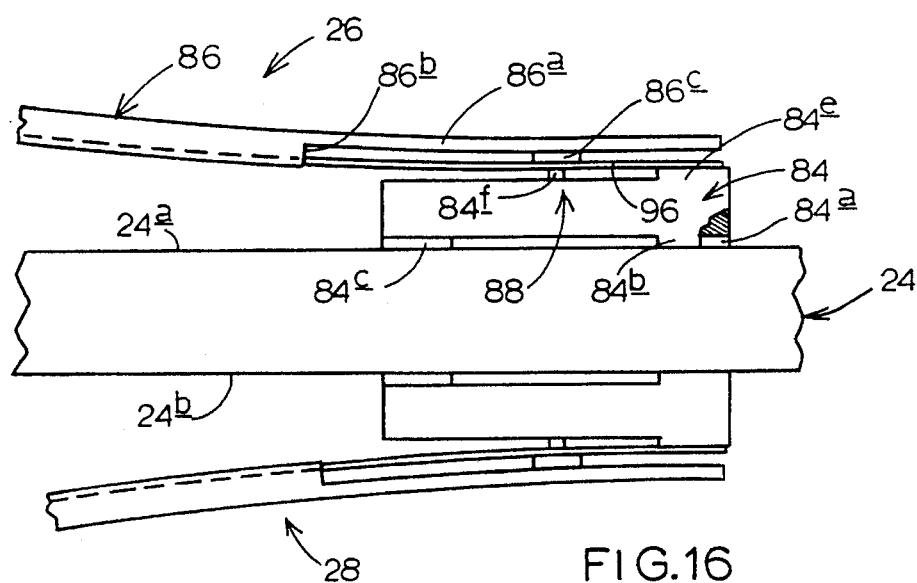

Turning attention now to FIGS. 15 and 16 in the drawings, here there are illustrated modified forms of construction for flexure 86 and for gimbal structure 88. In this modification, the body of the flexure is formed with its distal end 86a, rather than being laterally inset and blade-like (as in the first-described embodiment), having a lateral width which flows smoothly into and with the width of the remaining portion of the flexure body (see FIG. 15), and with this end extending from a step, or shoulder, 86b (see particularly FIG. 16) where it joins with the main portion of the body longitudinally to an extent where it completely overlies and "shelters" the attached/associated slider 84 and the distally extending, interconnective gimbal ribbons. Formed on the side of "stepped" end 86a which faces slider 84 is a central cylindrical projection 86c which provides the appropriate surface expanse which accommodates rocking contact with stud 84f in slider 84.

Laterally straddling projection 86c, and also forming part of gimbal structure 88 as before, are ribbons 94, 96 which are substantially the same in construction as their counterparts which bear the same numbers and which are illustrated in the prior-described embodiment of the invention. Ribbons 94, 96 lie, as can be seen, within a zone that is protected by end 86a.

In the modification now being described, flexure 86 and slider 84 are disposed, as before, generally in parallel planar relationship. Viewed normal to these planes, as in FIG. 15, one can see that the marginal boundaries of end 86a are substantially coextensive with those of slider 84.

Fabrication of the modification now being described differs only slightly from that which has been set forth in the steps mentioned earlier. What, in the embodiment now being described, forms a void space between end 86a and ribbons 94, 96, surrounding projection 86c will, during early fabrication stages, be filled in with deposited copper planarized to be level with what is shown as the undersurface of the main body of flexure 86 in FIG. 16. Ribbons 94, 96, and the conductors (mentioned with regard to the embodiment earlier described) that extend from these ribbons lengthwise in the main body of the flexure, are formed by the deposition of gold, tantalum, etc., with the ribbons lying on the surface of the filling-in copper just mentioned.

Slider 84 is unchanged in construction.

Bars of side-by-side adjacent sliders and flexures are joined as previously described, and a copper etch process is performed to free these structures from constraints, and to remove, at the same time, the copper filling which has heretofore occupied the space within a flexure between the extending ribbons, and the now roofing end 86a in the flexure.

This modified form of the invention offers a construction which provides extra resistance to damage that could be caused during shipping, handling or assembly operations.

Figure 18A:
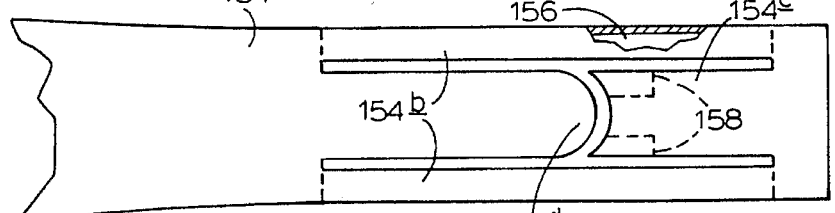
FIGS. 18A and 18B are fragmentary plan and side-elevation views, respectively, of a modified form of flexure unit usable with the transducer unit of FIGS. 17A, 17B.
Figure 18B:
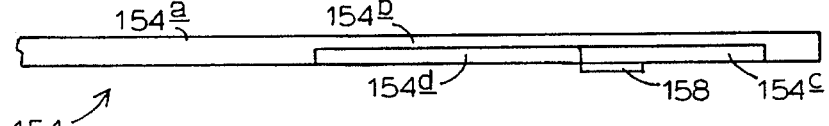
Figure 19:
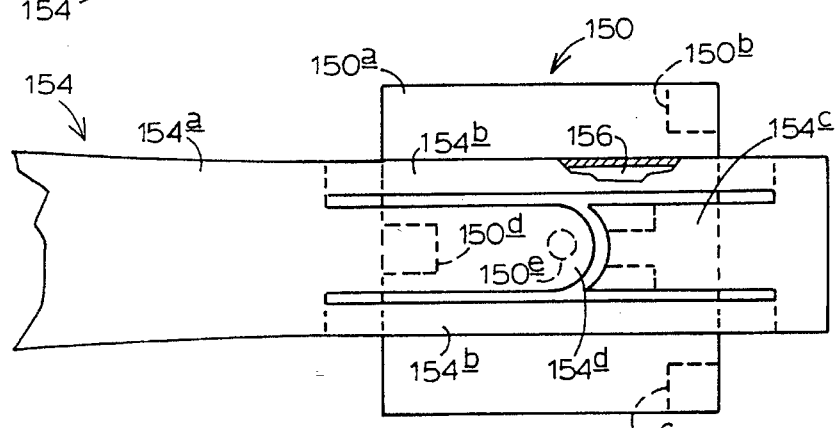
FIG. 19 is a fragmentary plan view illustrating the transducer unit and flexure unit of FIGS. 17A, 17B and 18A, 18B, respectively, assembled.
Figure 20:
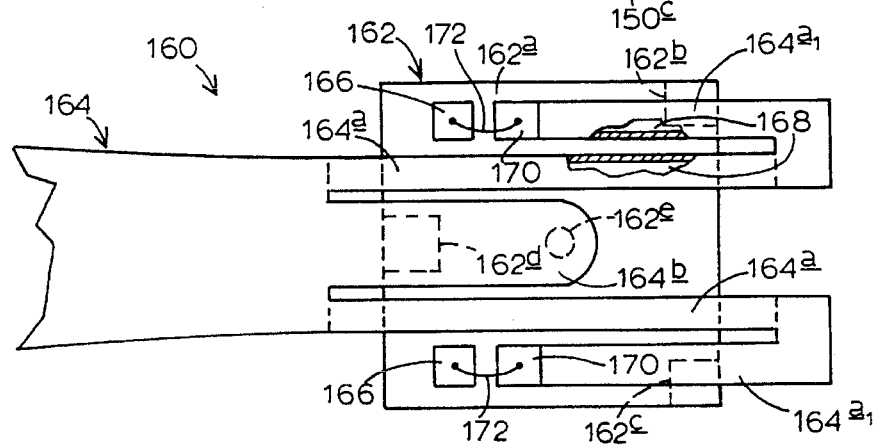
FIG. 20 is a fragmentary plan view illustrating yet another modification of an assembly constructed in accordance with the invention, wherein a wire-bond electrical interconnection is employed.

FIGS. 17A–20, inclusive, illustrate two other modifications of the assembly of the invention, with FIGS. 17A–19 illustrating one of these two modifications, and FIG. 20 illustrating the other. The transducer units and carrier units which make up these modifications are formed with dielectric bodies and with conductor structure and a read/write transducer, similar to those like-identified components mentioned earlier herein, with all fabrication performed utilizing thin-film deposition and patterning processes, and etch-release procedures, like those discussed earlier. Naturally, the specific patternings which are employed are different, and relate to the specific different outlines and topographies that characterize these modifications.

Figure 17A:
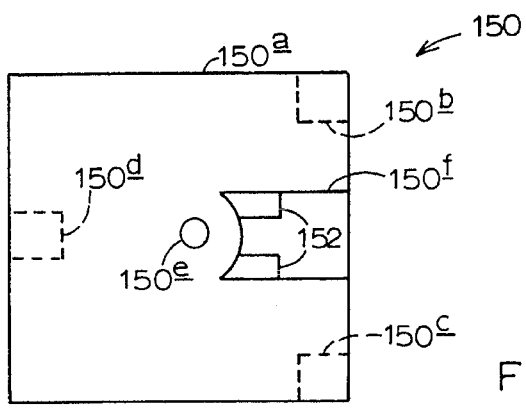
FIGS. 17A and 17B are fragmentary plan and side-elevation views, respectively, of another modified form of transducer unit.
Figure 17B:
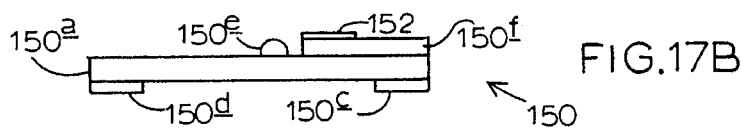

In FIGS. 17A, 17B, there is illustrated at 150 a transducer unit, or slider, which is shown isolated from other structure. Slider 150 has a body 150a which is generally planar (see particularly FIGS. 17B), from one side of which project three wear feet 150b, 150c, 150d, and from the opposite side of which project a fulcrum pin 150e and a post 150f. A read/write transducer with an appropriate read/write pole tip is formed in foot 150d, and, internally embedded conductive traces that extend from a coil included in this transducer continue to a pair of conductive bonding pads 152 (proportions distorted).

Turning attention to FIGS. 18A, 18B, here there is shown at 154 an elongate, generally planar dielectric flexure, or carrier unit, which is intended for joinder to slider 150. Flexure 154 includes a body 154a from the distal end in which project two laterally spaced ribbons 154b whose distal ends are joined through an interposing structure including a proximally extending tongue 154c. Also included in flexure 154, and projecting distally toward tongue 154c, is a laterally centered blade 154d whose far surface in FIG. 18A (its undersurface in FIG. 18B) is adapted rockingly to contact fulcrum pin 150e in slider 150, thus to form part of the gimbal structure. Conductive traces, such as the one shown at 156 in FIGS. 18A, 19, extend in the flexure toward conductive bonding pads 158 (proportions distorted) which are adapted for bonding to previously mentioned bonding pads 152.

In FIG. 19, slider 150 and flexure 154 are shown joined in generally parallel-planar relationship through suitable joinder of bonding pads 152, 158.

Shifting attention now, in FIG. 20, which is taken from the same point of view as that offered in FIG. 19, there is shown at 160 a gimbaled head/flexure/conductor assembly including a substantially planar transducer unit, or slider, 162, and an elongate, generally planar flexure, or carrier unit, 164.

Slider 162 includes a body 162a, three wear feet 162b, 162c, 162d, and a projecting fulcrum pin 162e. Foot 162d carries an embedded transducer including the necessary coil from which conductive traces, that are suitably formed within body 162a, extend to a pair of conductive bonding pads 166 which face the viewer in FIG. 20.

Flexure 164 includes, adjacent its distal end, a pair of laterally spaced, distally projecting ribbons 164a which include outrigger portions $164a_1$ that turn back, so-to-speak, to extend proximally over slider 162. Extending in the flexure, and through the ribbons and outrigger portions, are conductive traces, such as trace 168, which extend toward conductive bonding pads 170 that also face the viewer in FIG. 20. The far sides of outriggers $164a_1$ in FIG. 20 are suitably mechanically bonded to the side of slider 162 which faces the viewer in FIG. 20, and conventional conductive interconnects are established between bonding pads 166, 170 through well-known wire-bonding techniques. Wire-bond interconnects are shown at 172.

Extending distally from the distal end of the body in flexure 164 is a laterally-centered blade 164b which extends over and rockingly contacts fulcrum pin 162e. Slider 162 and flexure 164 are disposed generally in parallel planar relationship.

The modifications just discussed in FIGS. 17A–20, inclusive, offer different kinds of manufacturing capabilities, tolerances, resonance performances, etc. in comparison with the other modifications described herein, and they are designed to offer certain special advantages in certain applications. For example, the modifications illustrated in FIGS. 19 and 20 allow for assembly of a transducer unit to a carrier unit after each has been separated as an individual unit as well as in "bar" form as described above. To interconnect these two as individual units requires use of simple automated holding fixtures like those, for example, routinely used to align and bond die in the manufacture of semiconductor devices.

Turning attention now to FIGS. 21A, 21B, 21C to discuss one alternative embodiment of the present invention, the same is constructed in a manner (using conventional patterning and materials deposition steps) which is similar to that described in the incorporated-by-reference U.S. Pat. No. 5,041,932, which patent specifically illustrates and discusses a helical-coil head. The FIGS. 21A, 21B, 21C embodiment takes the form of a perpendicular, probe-type head utilizing more conventional multi-layer spiral, or "pancake", type coils, as illustrated in these three figures. As mentioned, the method of fabrication of such a structure is similar in all principal respects to that described in the '932 patent, except with respect to the relative locations of the immediately surrounding DLC material and aluminum oxide, which relative locations are illustrated in other figures herein, such as in FIG. 5.

Explaining generally this kited of an organization, shown in FIG. 21A, which is a view from the media-contact side of the structure, is a magnetic return pole 180, a portion of a spiral, pancake coil 182 and associated conductors 184, the tip of the pole, referred to hereinabove as, and illustrated at, 89, and a contact foot 186 which is like previously mentioned foot 84c, fabricated of DLC, wear-resistant, hardened material. The magnetic circuit is shown in a kind of section view in FIG. 21B, including previously mentioned return pole 180, a back-gap stud 188, a magnetic core 190, a yoke 192, and the pole connecting therewith and terminating in previously mentioned pole tip 89. Also shown in cross-section is multi-layer coil 182. This structure, as illustrated in FIG. 21C, is taken generally from the point of view of the left side of FIG. 21B.

The pancake coil thus illustrated in FIGS. 21A, 21B, 21C can be thought of as occupying a plane which is substantially parallel to the plane of FIG. 21A, normal to the planes of FIGS. 21B, 21C, and thus substantially parallel to the recording surface of a rigid recording medium, such as disk 24.

Still another embodiment of this invention is adapted for the employment of a "vertical" type probe head utilizing a multi-layer "pancake" type coil for perpendicular recording on two-layer media, and this embodiment is shown in sectional view in FIG. 22.

The structure shown in FIG. 22, which may readily be incorporated into, and form part of, the structure of the present invention, includes a pole with previously mentioned pole tip 89, magnetic yoke 194, magnetic back-gap stud 196, and magnetic flux-return pole 198. Distributed as a "pancake" coil around stud 196 is multi-layer coil 200. Coil 200 can be thought of as occupying a plane which extends vertically in FIG. 22 and normal to the plane of FIG. 22, and also normal to the long axis of an associated carrier unit, such as a flexure like previously mentioned flexure 86, which long axis extends generally to the left and to the right in FIG. 22. Pole tip 89 is exposed at the base of a DLC hardened-wear-material foot 202 which is like previously mentioned foot 84c.

Accordingly, there are disclosed herein several forms of a novel, low-effective mass, gimbaled head/flexure/conductor assembly, and a system incorporating the same, which offer all of the desirable features, and meet all of the objectives, set forth hereinabove. The proposed gimbaled structure provides decided advantages in manufacturing by allowing appreciable increases in dimensional and alignment tolerances in final assembly of integrated head/suspension structures and, in addition, lends itself to high-volume, reliable fabrication utilizing deposition processes on wafers, thus decreasing overall manufacturing costs. The gimbaled assembly of this invention takes advantage of the superior reading and writing performance attainable through contact operation with the recording surface of a rigid disk, while at the same time, by virtue of the presence of gimbal structure, addressing very satisfactorily the issue of disk-surface unflatness and other matters relating to dynamic changes in topography during system operation. The unique gimbal structure which is proposed utilizes ribbons that interconnect a transducer unit and a flexure, which ribbons have dual functionality—serving as a part of the mechanical gimbal suspension, and also as a part (carrier or otherwise) of the conductive circuit which communicates between the magnetic components in a read/write head and the outside world.

Where extra shipping, handling and assembly protection is desired for the relatively fragile gimbal ribbons, one can utilize the modified construction illustrated in FIGS. 15 and 16, wherein the distal end of the flexure body "roofs" over the zone containing these ribbons. The modifications shown in FIGS. 17A–20 offer other assembly construction possibilities which can allow more readily for the interconnection of individual transducer units to individual or row-mounted carrier units. These modifications also offer the potential for wide variation of dynamic resonance characteristics through the expedient of readily changing the sizes and shapes of the gimbal ribbons. The modification pictured in FIG. 20 provides the additional capability to provide a mechanical interconnect which is independent of an electrical interconnect should such be required for reliability or other reasons.

Accordingly, while a preferred embodiment, and several modifications, of a gimbaled head/flexure/conductor assembly, a system employing the same, and specific fabrication steps, have been illustrated and described herein, we appreciate that variations and modifications may be thought about by those skilled in the art, and may be made without departing from the spirit of the invention.

It is desired to claim and secure by Letters Patent:

1. A head/flexure/conductor assembly for reading and writing information via a relatively moving recording surface of a rigid magnetic recording medium comprising a read/write transducer unit adapted for sliding on the recording surface during communication with the medium, an elongate carrier unit for supporting said transducer unit, said carrier unit having a longitudinal axis oriented substantially along a direction of said sliding, and gimbal structure interconnecting and articulating said units for selected, limited relative movement, said gimbal structure including a pair of laterally spaced, elongate ribbons extending between and connecting said transducer unit and said carrier unit.

2. A gimbaled head/flexure/conductor assembly for the reading and writing of digital information during contact with the recording surface of a rigid magnetic disk, said assembly comprising a slider containing a read/write head and associated head conductor structure, an elongate flexure structure including a flexure conductor and pivotally attached, distal to said slider, to a mounting structure, and a gimbal structure operatively interconnecting said slider and said flexure for accommodating limited relative movement between slider and flexure, said gimbal structure including a gimbal conductor conductively interconnecting said head conductor and said flexure conductor, said gimbal structure including a pair of laterally spaced, elongate ribbons extending between and connecting said slider and said flexure.

3. A head/flexure/conductor assembly for reading and writing information with respect to a rigid magnetic recording medium comprising a read/write transducer unit, wherein said transducer unit includes head structure formed with electrical coil structure which has a multi-layer, pancake-like configuration, an elongate carrier unit for supporting said transducer unit, and gimbal structure interconnecting and articulating said units for selected, limited relative movement, wherein said gimbal structure includes a pair of laterally spaced, elongate ribbons between the units, wherein the assembly is intended for use with such a medium that has a generally planar recording surface, and wherein each layer in said pancake-like configuration is generally planar and occupies a plane substantially paralleling that of such surface.

4. A head/flexure/conductor assembly for reading and writing information with respect to the recording surface in a rigid magnetic recording medium comprising a read/write transducer unit, adapted for sliding contact with the recording surface in such a medium, the transducer unit formed with projecting sliding-contact feet for this purpose, a pivotally mounted, elongate carrier unit for supporting said transducer unit, and gimbal structure interconnecting and articulating said transducer unit and said carrier unit for selected, limited relative movement.

5. A read/write organization for use with a rigid magnetic recording medium that has a generally planar recording surface comprising a gimbaled head/flexure/conductor assembly that includes head structure formed with electrical coil structure which has a multilayer, pancake-like configuration, wherein each layer in said pancake-like configuration is generally planar and occupies a plane substantially paralleling that of such surface.

6. A rigid disk magnetic recording system comprising a rigid magnetic recording disk having a generally planar recording surface, and a gimbaled head/flexure/conductor assembly operable with respect to said recording surface for reading and writing magnetic information with respect thereto, said assembly including head structure formed with electrical coil structure which has a multilayer, pancake-like configuration, wherein each layer in said pancake-like configuration is generally planar and occupies a plane substantially paralleling that of said surface.

7. A transducer for communication with a rigid magnetic storage disk comprising an elongate beam extending between a mounting end and a free end, including a plurality of longitudinal electrical conductors, a gimbal disposed adjacent to said free end and coupled to said beam, and a slider connected to said gimbal having an embedded magnetic pole structure with an exposed pole tip for communication with the rigid magnetic storage disk while sliding on the disk in a direction oriented substantially along a longitudinal axis of said beam.

8. An information storage system comprising a rigid disk having a surface with an associated magnetic storage medium, an elongated beam extending between a pivot and a free end adjacent to said surface in a direction crossing a radius of said disk, and a slider connected by a gimbal to said beam adjacent to said free end, said slider containing an embedded pole structure with an exposed pole tip and in dynamic contact with said surface during communication between said pole and said medium.

9. The assembly of claim 1 which further includes conductor structure, and wherein at least a portion of said gimbal structure forms part of said conductor structure.

10. The assembly of claim 1, wherein said carrier unit has a distal end, and said ribbons join with said carrier unit adjacent said end with the ribbons including portions extending proximally toward said transducer unit, relative to their regions of joinder with the carrier unit.

11. The assembly of claims 1 or 2, wherein said units are generally planar and disposed generally in parallel planar relationship with respect to one another, and said gimbal structure is constructed to allow limited relative pitch and roll between said units, while inhibiting relative yaw between the two.

12. The assembly of claim 10 which further includes conductor structure, and wherein said ribbons are part of said conductor structure.

13. The assembly of claim 1, wherein said carrier unit includes a portion extending adjacent and overlying a zone containing said ribbons.

14. The assembly of claim 1, wherein said gimbal structure includes a laterally centered, proximally extending tongue interposed said ribbons and said transducer unit.

15. The assembly of claim 1 which further includes conductor structure, and wherein said ribbons form part of said conductor structure.

16. The assembly of claim 1, wherein said units are generally planar and disposed generally in parallel planar relationship with respect to one another, and said gimbal structure is constructed to allow limited relative pitch and roll between said units, while inhibiting relative yaw between the units.

17. The assembly of claim 1, wherein said transducer unit includes a vertical-load-transmitting fulcrum structure, and said carrier unit includes a surface expanse disposed in rocking contact with said fulcrum structure, said fulcrum structure and said surface expanse forming part of said gimbal structure.

18. The assembly of claim 11, wherein said transducer unit includes a vertical-load-transmitting fulcrum structure, and said carrier unit includes a surface expanse disposed in rocking contact with said fulcrum structure, said fulcrum structure and said surface expanse forming part of said gimbal structure.

19. The assembly of claim 1, wherein said transducer unit is adapted for sliding contact with the recording surface in such a medium, and the transducer unit is formed with projecting sliding-contact feet for this purpose.

20. The assembly of claims 19 or 4, wherein at least one of said feet is formed of a hardened wear material.

21. The assembly of claims 19 or 4, wherein said feet are formed of a hardened wear material.

22. The assembly of claim 20, wherein said wear material has a Knoop hardness not less than about 1000-kg/mm$^2$.

23. The assembly of claims 19 or 4, wherein said feet are three in number.

24. The assembly of claim 21, wherein said feet are three in number.

25. The assembly of claim 16, wherein said transducer unit is adapted for sliding contact with the recording surface in such a medium, and the transducer unit is formed with projecting sliding-contact feet for this purpose.

26. The assembly of claim 17, wherein said transducer unit is adapted for sliding contact with the recording surface in such a medium, and the transducer unit is formed with projecting sliding-contact feet for this purpose.

27. The assembly of claim 18, wherein said transducer unit is adapted for sliding contact with the recording surface in such a medium, and the transducer unit is formed with projecting sliding-contact feet for this purpose.

28. The assembly of claim 2, wherein said ribbons form the gimbal conductor.

29. The assembly of claim 2, wherein said slider and flexure are generally planar and disposed generally in parallel planar relationship with respect to one another, and said gimbal structure is constructed to allow limited relative pitch and roll between the slider and flexure, while inhibiting relative yaw between the two.

30. The assembly of claim 2, wherein said slider includes a vertical-load-transmitting fulcrum structure, and said flexure includes a surface expanse disposed in rocking contact with said fulcrum structure, said fulcrum structure and said surface expanse forming part of said gimbal structure.

31. The assembly of claim 2, wherein said slider is adapted for sliding contact with such a recording surface, and the slider is formed with projecting sliding-contact feet for this purpose.

32. The assembly of claim 31, wherein said feet are formed of a hardened wear material.

33. The assembly of claim 31, wherein said feet are three in number.

34. The assembly of claim 32, wherein said feet are three in number.

35. The assembly of claims 1, 2, 10, 11, 12, 13, 14 or 15, wherein said transducer unit includes head structure formed with electrical coil structure which has an elongate, helical configuration distributed lengthwise relative to said carrier unit.

36. The assembly of claim 16, wherein said transducer unit includes head structure formed with electrical coil structure which has an elongate, helical configuration distributed lengthwise relative to said carrier unit.

37. The assembly of claim 17, wherein said transducer unit includes head structure formed with electrical coil structure which has an elongate, helical configuration distributed lengthwise relative to said carrier unit.

38. The assembly of claim 18, wherein said transducer unit includes head structure formed with electrical coil structure which has an elongate, helical configuration distributed lengthwise relative to said carrier unit.

39. The assembly of claims 19 or 4, wherein said transducer unit includes head structure formed with electrical coil structure which has an elongate, helical configuration distributed lengthwise relative to said carrier unit.

40. The assembly of claim 20, wherein said transducer unit includes head structure formed with electrical coil structure which has an elongate, helical configuration distributed lengthwise relative to said carrier unit.

41. The assembly of claim 21, wherein said transducer unit includes head structure formed with electrical coil structure which has an elongate, helical configuration distributed lengthwise relative to said carrier unit.

42. The assembly of claim 22, wherein said transducer unit includes head structure formed with electrical coil structure which has an elongate, helical configuration distributed lengthwise relative to said carrier unit.

43. The assembly of claim 23, wherein said transducer unit includes head structure formed with electrical coil structure which has an elongate, helical configuration distributed lengthwise relative to said carrier unit.

44. The assembly of claim 24, wherein said transducer unit includes head structure formed with electrical coil structure which has an elongate, helical configuration distributed lengthwise relative to said carrier unit.

45. The assembly of claim 25, wherein said transducer unit includes head structure formed with electrical coil structure which has an elongate, helical configuration distributed lengthwise relative to said carrier unit.

46. The assembly of claim 26, wherein said transducer unit includes head structure formed with electrical coil structure which has an elongate, helical configuration distributed lengthwise relative to said carrier unit.

47. The assembly of claim 27, wherein said transducer unit includes head structure formed with electrical coil structure which has an elongate, helical configuration distributed lengthwise relative to said carrier unit.

48. The assembly of claims 2 or 28, wherein said read/write head includes electrical coil structure which has an elongate, helical configuration distributed lengthwise relative to said flexure.

49. The assembly of claim 29, wherein said read/write head includes electrical coil structure which has an elongate, helical configuration distributed lengthwise relative to said flexure.

50. The assembly of claim 30, wherein said read/write head includes electrical coil structure which has an elongate, helical configuration distributed lengthwise relative to said flexure.

51. The assembly of claim 31, wherein said read/write head includes electrical coil structure which has an elongate, helical configuration distributed lengthwise relative to said flexure.

52. The assembly of claim 32, wherein said read/write head includes electrical coil structure which has an elongate, helical configuration distributed lengthwise relative to said flexure.

53. The assembly of claim 33, wherein said read/write head includes electrical coil structure which has an elongate, helical configuration distributed lengthwise relative to said flexure.

54. The assembly of claim 24, wherein said read/write head includes electrical coil structure which has an elongate, helical configuration distributed lengthwise relative to said flexure.

55. The assembly of claims 1, 2, 10, 11, 12, 13, 14 or 15, wherein said transducer unit includes head structure formed with electrical coil structure which has a multilayer, pancake-like configuration.

56. The assembly of claim 16, wherein said transducer unit includes head structure formed with electrical coil structure which has a multilayer, pancake-like configuration.

57. The assembly of claim 17, wherein said transducer unit includes head structure formed with electrical coil structure which has a multilayer, pancake-like configuration.

58. The assembly of claim 18, wherein said transducer unit includes head structure formed with electrical coil structure which has a multilayer, pancake-like configuration.

59. The assembly of claims 19 or 4, wherein said transducer unit includes head structure formed with electrical coil structure which has a multilayer, pancake-like configuration.

60. The assembly of claim 20, wherein said transducer unit includes head structure formed with electrical coil structure which has a multilayer, pancake-like configuration.

61. The assembly of claim 21, wherein said transducer unit includes head structure formed with electrical coil structure which has a multilayer, pancake-like configuration.

62. The assembly of claim 22, wherein said transducer unit includes head structure formed with electrical coil structure which has a multilayer, pancake-like configuration.

63. The assembly of claim 23, wherein said transducer unit includes head structure formed with electrical coil structure which has a multilayer, pancake-like configuration.

64. The assembly of claim 24, wherein said transducer unit includes head structure formed with electrical coil structure which has a multilayer, pancake-like configuration.

65. The assembly of claim 25, wherein said transducer unit includes head structure formed with electrical coil structure which has a multilayer, pancake-like configuration.

66. The assembly of claim 26, wherein said transducer unit includes head structure formed with electrical coil structure which has a multilayer, pancake-like configuration.

67. The assembly of claim 27, wherein said transducer unit includes head structure formed with electrical coil structure which has a multilayer, pancake-like configuration.

68. The assembly of claims 2 or 28, wherein said read/write head includes electrical coil structure which has a multilayer, pancake-like configuration.

69. The assembly of claim 29, wherein said read/write head includes electrical coil structure which has a multilayer, pancake-like configuration.

70. The assembly of claim 38, wherein said read/write head includes electrical coil structure which has a multi-layer, pancake-like configuration.

71. The assembly of claim 31, wherein said read/write head includes electrical coil structure which has a multi-layer, pancake-like configuration.

72. The assembly of claim 32, wherein said read/write head includes electrical coil structure which has a multi-layer, pancake-like configuration.

73. The assembly of claim 33, wherein said read/write head includes electrical coil structure which has a multi-layer, pancake-like configuration.

74. The assembly of claim 34, wherein said read/write head includes electrical coil structure which has a multi-layer, pancake-like configuration.

75. The assembly of claim 56 which is intended for use with such a medium that has a generally planar recording surface, and wherein each layer in said pancake-like configuration is generally planar and occupies a plane substantially paralleling that of such surface.

76. The assembly of claim 57 which is intended for use with such a medium that has a generally planar recording surface, and wherein each layer in said pancake-like configuration is generally planar and occupies a plane substantially paralleling that of such surface.

77. The assembly of claim 58 which is intended for use with such a medium that has a generally planar recording surface, and wherein each layer in said pancake-like configuration is generally planar and occupies a plane substantially paralleling that of such surface.

78. The assembly of claim 59 which is intended for use with such a medium that has a generally planar recording surface, and wherein each layer in said pancake-like configuration is generally planar and occupies a plane substantially paralleling that of such surface.

79. The assembly of claim 60 which is intended for use with such a medium that has a generally planar recording surface, and wherein each layer in said pancake-like configuration is generally planar and occupies a plane substantially paralleling that of such surface.

80. The assembly of claim 61 which is intended for use with such a medium that has a generally planar recording surface, and wherein each layer in said pancake-like configuration is generally planar and occupies a plane substantially paralleling that of such surface.

81. The assembly of claim 62 which is intended for use with such a medium that has a generally planar recording surface, and wherein each layer in said pancake-like configuration is generally planar and occupies a plane substantially paralleling that of such surface.

82. The assembly of claim 63 which is intended for use with such a medium that has a generally planar recording surface, and wherein each layer in said pancake-like configuration is generally planar and occupies a plane substantially paralleling that of such surface.

83. The assembly of claim 64 which is intended for use with such a medium that has a generally planar recording surface, and wherein each layer in said pancake-like configuration is generally planar and occupies a plane substantially paralleling that of such surface.

84. The assembly of claim 65 which is intended for use with such a medium that has a generally planar recording surface, and wherein each layer in said pancake-like configuration is generally planar and occupies a plane substantially paralleling that of such surface.

85. The assembly of claim 66 which is intended for use with such a medium that has a generally planar recording surface, and wherein each layer in said pancake-like configuration is generally planar and occupies a plane substantially paralleling that of such surface.

86. The assembly of claim 67 which is intended for use with such a medium that has a generally planar recording surface, and wherein each layer in said pancake-like configuration is generally planar and occupies a plane substantially paralleling that of such surface.

87. The assembly of claim 68 which is intended for use with such a medium that has a generally planar recording surface, and wherein each layer in said pancake-like configuration is generally planar and occupies a plane substantially paralleling that of such surface.

88. The assembly of claim 69 which is intended for use with such a medium that has a generally planar recording surface, and wherein each layer in said pancake-like configuration is generally planar and occupies a plane substantially paralleling that of such surface.

89. The assembly of claim 70 which is intended for use with such a medium that has a generally planar recording surface, and wherein each layer in said pancake-like configuration is generally planar and occupies a plane substantially paralleling that of such surface.

90. The assembly of claim 71 which is intended for use with such a medium that has a generally planar recording surface, and wherein each layer in said pancake-like configuration is generally planar and occupies a plane substantially paralleling that of such surface.

91. The assembly of claim 72 which is intended for use with such a medium that has a generally planar recording surface, and wherein each layer in said pancake-like configuration is generally planar and occupies a plane substantially paralleling that of such surface.

92. The assembly of claim 73 which is intended for use with such a medium that has a generally planar recording surface, and wherein each layer in said pancake-like configuration is generally planar and occupies a plane substantially paralleling that of such surface.

93. The assembly of claim 74 which is intended for use with such a medium that has a generally planar recording surface, and wherein each layer in said pancake-like configuration is generally planar and occupies a plane substantially paralleling that of such surface.

94. The assembly of claim 55 which is intended for use with such a medium that has a generally planar recording surface, and wherein each layer in said pancake-like configuration is generally planar and occupies a plane which is substantially normal to the long axis of said carrier unit.

95. The assembly of claim 56 which is intended for use with such a medium that has a generally planar recording surface, and wherein each layer in said pancake-like configuration is generally planar and occupies a plane which is substantially normal to the long axis of said carrier unit.

96. The assembly of claim 57 which is intended for use with such a medium that has a generally planar recording surface, and wherein each layer in said pancake-like configuration is generally planar and occupies a plane which is substantially normal to the long axis of said carrier unit.

97. The assembly of claim 58 which is intended for use with such a medium that has a generally planar recording surface, and wherein each layer in said pancake-like configuration is generally planar and occupies a plane which is substantially normal to the long axis of said carrier unit.

98. The assembly of claim 59 which is intended for use with such a medium that has a generally planar recording surface, and wherein each layer in said pancake-like configuration is generally planar and occupies a plane which is substantially normal to the long axis of said carrier unit.

99. The assembly of claim 60 which is intended for use with such a medium that has a generally planar recording surface, and wherein each layer in said pancake-like configuration is generally planar and occupies a plane which is substantially normal to the long axis of said carrier unit.

100. The assembly of claim 61 which is intended for use with such a medium that has a generally planar recording surface, and wherein each layer in said pancake-like configuration is generally planar and occupies a plane which is substantially normal to the long axis of said carrier unit.

101. The assembly of claim 62 which is intended for use with such a medium that has a generally planar recording surface, and wherein each layer in said pancake-like configuration is generally planar and occupies a plane which is substantially normal to the long axis of said carrier unit.

102. The assembly of claim 63 which is intended for use with such a medium that has a generally planar recording surface, and wherein each layer in said pancake-like configuration is generally planar and occupies a plane which is substantially normal to the long axis of said carrier unit.

103. The assembly of claim 64 which is intended for use with such a medium that has a generally planar recording surface, and wherein each layer in said pancake-like configuration is generally planar and occupies a plane which is substantially normal to the long axis of said carrier unit.

104. The assembly of claim 65 which is intended for use with such a medium that has a generally planar recording surface, and wherein each layer in said pancake-like configuration is generally planar and occupies a plane which is substantially normal to the long axis of said carrier unit.

105. The assembly of claim 66 Which is intended for use with such a medium that has a generally planar recording surface, and wherein each layer in said pancake-like configuration is generally planar and occupies a plane which is substantially normal to the long axis of said carrier unit.

106. The assembly of claim 67 which is intended for use with such a medium that has a generally planar recording surface, and wherein each layer in said pancake-like configuration is generally planar and occupies a plane which is substantially normal to the long axis of said carrier unit.

107. The assembly of claim 68 which is intended for use with such a medium that has a generally planar recording surface, and wherein each layer in said pancake-like configuration is generally planar and occupies a plane which is substantially normal to the long axis of said carrier unit.

108. The assembly of claim 69 which is intended for use with such a medium that has a generally planar recording surface, and wherein each layer in said pancake-like configuration is generally planar and occupies a plane which is substantially normal to the long axis of said carrier unit.

109. The assembly of claim 70 which is intended for use with such a medium that has a generally planar recording surface, and wherein each layer in said pancake-like configuration is generally planar and occupies a plane which is substantially normal to the long axis of said carrier unit.

110. The assembly of claim 71 which is intended for use with such a medium that has a generally planar recording surface, and wherein each layer in said pancake-like configuration is generally planar and occupies a plane which is substantially normal to the long axis of said carrier unit.

111. The assembly of claim 72 which is intended for use with such a medium that has a generally planar recording surface, and wherein each layer in said pancake-like configuration is generally planar and occupies a plane which is substantially normal to the long axis of said carrier unit.

112. The assembly of claim 73 which is intended for use with such a medium that has a generally planar recording surface, and wherein each layer in said pancake-like configuration is generally planar and occupies a plane which is substantially normal to the long axis of said carrier unit.

113. The assembly of claim 74 which is intended for use with such a medium that has a generally planar recording surface, and wherein each layer in said pancake-like configuration is generally planar and occupies a plane which is substantially normal to the long axis of said carrier unit.

114. The assembly of claim 21, wherein said wear material has a Knoop hardness not less than about 1000-kg/mm$^2$.

115. The assembly of claim 18, wherein said transducer unit is adapted for sliding contact with the recording surface in such a medium, and the transducer unit is formed with projecting sliding-contact feet for this purpose.

116. The assembly of claim 114, wherein said transducer unit includes head structure formed with electrical coil structure which has an elongate, helical configuration distributed lengthwise relative to said carrier unit.

117. The assembly of claim 115, wherein said transducer unit includes head structure formed with electrical coil structure which has an elongate, helical configuration distributed lengthwise relative to said carrier unit.

118. The transducer of claim 7, wherein a longitudinal axis of said beam is oriented substantially along a direction of said sliding..

119. The transducer of claim 7, wherein said pole tip is disposed on a bottom surface of said slider.

120. The transducer of claim 7, wherein said pole tip is disposed on a bottom portion of said slider.

121. The transducer of claim 7, wherein said slider has at least one leg and said pole tip is disposed at a bottom of said leg.

122. The transducer of claim 7, wherein said slider has three legs and said pole tip is disposed at a bottom of one of said legs.

123. The transducer of claim 8, wherein said pole tip is disposed on a surface of said slider adjacent to said surface.

124. The transducer of claim 8, wherein said disk rotates about a disk axis and said beam pivots about a pivot axis, said pivot axis being oriented substantially parallel to said disk axis.

125. The transducer of claim 8, wherein said slider has at least one leg and said pole tip is disposed at a bottom of said leg.

126. The transducer of claim 8, wherein said slider has three legs and said pole tip is disposed at a bottom of one of said legs.

* * * * *

UNITED STATES PATENT AND TRADEMARK OFFICE
CERTIFICATE OF CORRECTION

PATENT NO. : 5,490,027
DATED : February 6, 1996
INVENTOR(S) : Harold J. Hamilton and Timothy W. Martin It is certified that error appears in the above-indentified patent and that said Letters Patent is hereby corrected as shown below:

In column 14, line 32, delete "structure".

In column 14, line 37, after "between" insert --said-- and after "and" insert --said--.

In column 14, line 39, after "conductor" insert --structure--.

In column 15, line 2, after "for" delete "this purpose" and insert --said sliding--.

In column 15, line 59, after "1" delete "or 2".

In column 16, line 30, delete "for this purpose".

In column 16, line 44, delete "for this purpose".

In column 16, line 48, delete "for this purpose".

In column 16, line 52, delete "for this purpose".

In column 17, line 2, delete "for this purpose".

In column 17, line 9, after "1," delete "2,".

In column 18, line 18, after "said" delete "read/write".

In column 18, line 19, delete "head" and insert --transducer unit--.

In column 18, line 22, after "1," delete "2,".

In column 19, line 20, delete "such" and insert --said".

UNITED STATES PATENT AND TRADEMARK OFFICE
CERTIFICATE OF CORRECTION

PATENT NO. : 5,490,027
DATED : February 6, 1996
INVENTOR(S) : Harold J. Hamilton and Timothy W. Martin It is certified that error appears in the above-indentified patent and that said Letters Patent is hereby corrected as shown below:

In column 19, line 25, delete "such" and insert --said--.

In column 19, line 30, delete "such" and insert --said--.

In column 19, line 35, delete "such" and insert --said--.

In column 19, line 40, delete "such" and insert --said--.

In column 19, line 45, delete "such" and insert --said--.

In column 19, line 50, delete "such" and insert --said--.

In column 19, line 55, delete "such" and insert --said--.

In column 19, line 60, delete "such" and insert --said--.

In column 19, line 65, delete "such" and insert --said--.

In column 20, line 3, delete "such" and insert --said--.

In column 20, line 8, delete "such" and insert --said--.

In column 20, line 13, delete "such" and insert --said--.

In column 20, line 17, delete "such" and insert --said--.

In column 20, line 22, delete "such" and insert --said--.

In column 20, line 27, delete "such" and insert --said--.

In column 20, line 32, delete "such" and insert --said--.

UNITED STATES PATENT AND TRADEMARK OFFICE
CERTIFICATE OF CORRECTION

PATENT NO. : 5,490,027
DATED : February 6, 1996
INVENTOR(S) : Harold J. Hamilton and Timothy W. Martin Page 3 of 4

It is certified that error appears in the above-indentified patent and that said Letters Patent is hereby corrected as shown below:

In column 20, line 37, delete "such" and insert --said--.

In column 20, line 42, delete "such" and insert --said--.

In column 21, line 45, delete "carrier unit" and insert --flexure--.

In column 21, line 50, delete "carrier unit" and insert --flexure--.

In column 22, line 2, delete "carrier unit" and insert --flexure--.

In column 22, line 7, delete "carrier unit" and insert --flexure--.

In column 22, line 12, delete "carrier unit" and insert --flexure--.

In column 22, line 17, delete "carrier unit" and insert --flexure--.

In column 22, line 23, delete "for this purpose".

In column 22, line 34, delete "said" and the second ".".

In column 22, line 36, delete "bottom" and insert --disk-facing--.

In column 22, line 38, delete "bottom" and insert --disk-facing--.

In column 22, line 40, delete "bottom" and insert --disk-facing portion--.

In column 22, line 43, delete "bottom" and insert --disk-facing portion--.

In column 22, line 45, delete "transducer" and insert --system--.

UNITED STATES PATENT AND TRADEMARK OFFICE
CERTIFICATE OF CORRECTION

PATENT NO. : 5,490,027

DATED : February 6, 1996

INVENTOR(S) : Harold J. Hamilton and Timothy W. Martin

It is certified that error appears in the above-indentified patent and that said Letters Patent is hereby corrected as shown below:

In column 22, line 46, after "adjacent to said" insert --disk--.

In column 22, line 47, delete "transducer" and insert --system--.

In column 22, line 51, delete "transducer" and insert --system--.

In column 22, line 52, delete "bottom" and insert --disk-facing portion--.

In column 22, line 54, delete "transducer" and insert --system--.

In column 22, line 55, delete "bottom" and insert --disk-facing portion--.

Signed and Sealed this

Fourteenth Day of April, 1998

*Attest:*

BRUCE LEHMAN

*Attesting Officer*   *Commissioner of Patents and Trademarks*